(12) United States Patent  (10) Patent No.: US 9,175,713 B2
Warikoo et al.  (45) Date of Patent: Nov. 3, 2015

(54) BOLT FOR GAS TURBINE ENGINE ROTOR

(71) Applicant: Pratt & Whitney Canada Corp., Longueuil (CA)

(72) Inventors: Raman Warikoo, Oakville (CA); Sergey Platonov, St-Petersburg (RU)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 247 days.

(21) Appl. No.: 14/039,252

(22) Filed: Sep. 27, 2013

(65) Prior Publication Data

US 2015/0093211 A1  Apr. 2, 2015

(51) Int. Cl.
*F16B 25/00* (2006.01)
*F16B 35/04* (2006.01)
*F16B 1/00* (2006.01)

(52) U.S. Cl.
CPC ............... *F16B 35/041* (2013.01); *F16B 1/00* (2013.01)

(58) Field of Classification Search
CPC .............................. F16B 33/02; F16B 35/048
USPC .................................................. 411/422, 386
See application file for complete search history.

(56) References Cited

U.S. PATENT DOCUMENTS

| | | | |
|---|---|---|---|
| 1,926,925 A * | 9/1933 | Wescott | 403/296 |
| 2,895,367 A | 7/1959 | Nagy | |
| 3,748,948 A | 7/1973 | Schmitt | |
| 3,821,871 A | 7/1974 | Schmitt | |
| 3,828,422 A | 8/1974 | Schmitt | |
| 4,230,016 A | 10/1980 | Merrell | |
| 4,735,537 A | 4/1988 | Rath | |
| 4,842,466 A | 6/1989 | Wheeler et al. | |
| 4,915,559 A * | 4/1990 | Wheeler et al. | 411/366.3 |
| 4,917,555 A | 4/1990 | Taubert | |
| 4,957,401 A | 9/1990 | Hatter | |
| 5,039,265 A | 8/1991 | Rath et al. | |
| 5,320,467 A | 6/1994 | Erbes | |
| 5,779,416 A * | 7/1998 | Sternitzky | 411/411 |
| 5,788,441 A | 8/1998 | Karabestos et al. | |
| 6,149,363 A | 11/2000 | March | |
| 6,485,220 B2 | 11/2002 | Hecht | |
| 6,503,038 B2 * | 1/2003 | McGough | 411/424 |
| 7,677,854 B2 | 3/2010 | Langewiesche | |

* cited by examiner

*Primary Examiner* — Gary Estremsky
(74) *Attorney, Agent, or Firm* — Norton Rose Fulbright Canada LLP

(57) ABSTRACT

The bolt has, in sequence along a bolt axis: a threaded portion, a thread run-out portion, a shank, and a head, the threaded portion having a thread with a given root radius and a given depth, the thread run-out portion connected to the shank via a thread run-out fillet having a thread run-out fillet radius, the thread run-out fillet radius being between two and six times the thread root radius.

11 Claims, 4 Drawing Sheets

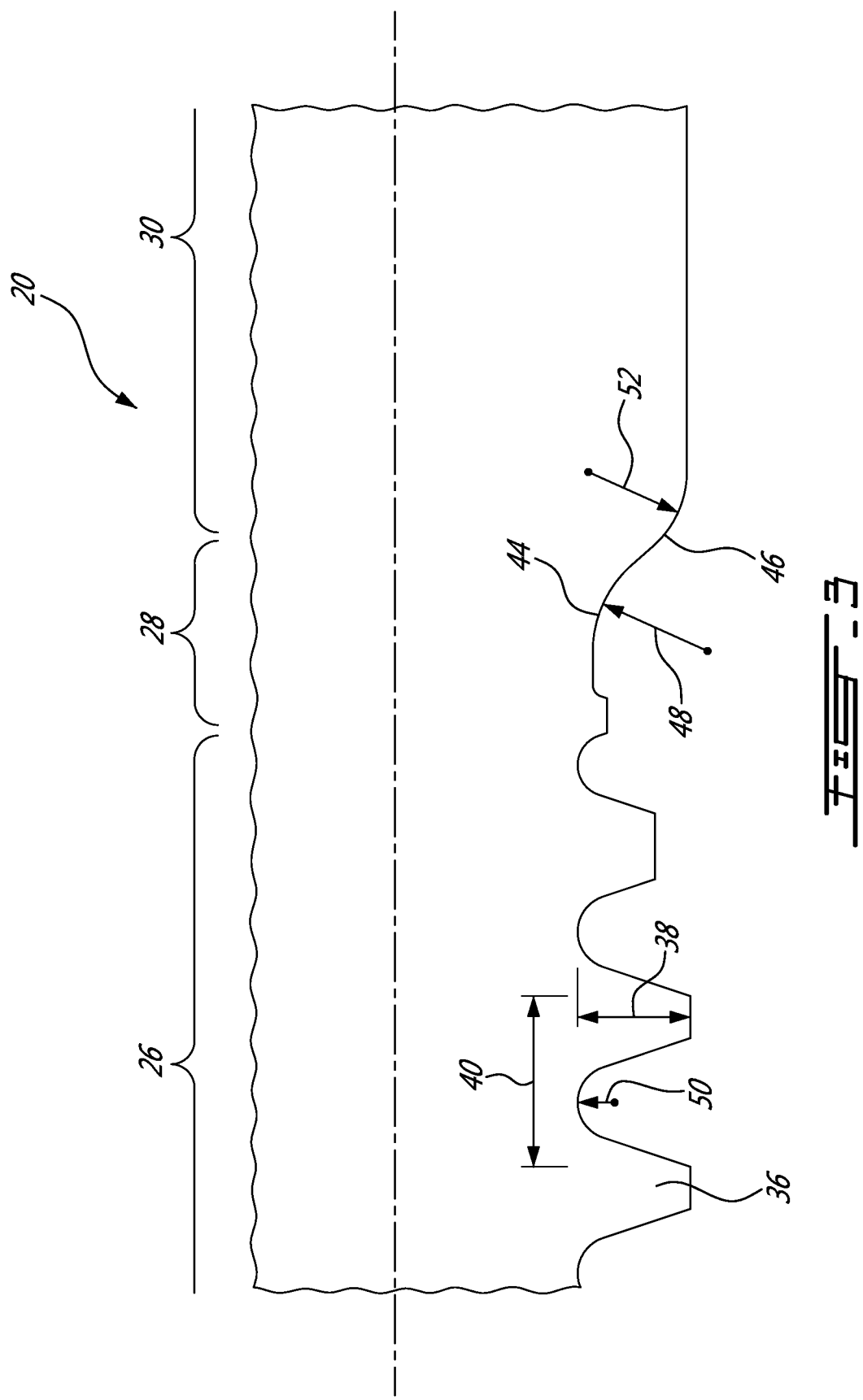

BOLT FOR GAS TURBINE ENGINE ROTOR

TECHNICAL FIELD

The application relates generally to the field of gas turbine engines and, more particularly, to bolts suited for used in rotating structures.

BACKGROUND OF THE ART

Bolts are sometimes the only suitable option for clamping small size rotors having low bore radii. The head of the bolt is on one side of the bore, the shank of the bolt extends inside the bore, and the threaded portion extends out the other side of the bore, to which a nut is secured in a "thru bolt" configuration. Thru bolts can provide satisfactory access for torquing/untorquing. Bolt weight, nut weight, tightening torques, distance between the bolt's axis and the rotation axis, and rotation speed can be high, which can result in significantly high stresses in the bolt which can limit the bolt life. Lightweight alloys for the bolt have been used to achieve acceptable low-cycle fatigue (LCF) life for the discs, but there are limits in the advantages gainable solely by alloy selection since some properties or features of lightweight materials are typically traded off for their lighter weight.

Accordingly, there remains room for improvement in addressing LCF life of bolts, especially in the context of high stress rotary environments.

SUMMARY

In one aspect, there is provided a bolt comprising in sequence, along a bolt axis: a threaded portion, a thread run-out portion, a shank, and a head, the threaded portion having a thread with a given root radius and a given depth, the thread run-out portion connected to the shank via a thread run-out fillet having a thread run-out fillet radius, the thread run-out fillet radius being between two and six times the root radius. The run-out profile can be a single radius or a combination of multiple radii or a curve.

In a second aspect, there is provided use of the bolt to assemble rotary components with the bolt axis parallel and spaced-apart from a rotation axis of the rotary components.

In a third aspect, there is provided a bolt comprising in sequence, along a bolt axis: a threaded portion, a thread run-out portion, a shank, and a head, the threaded portion having a thread with a predetermined root radius and a predetermined depth, the thread run-out portion connected to the shank via a thread run-out fillet having an average radius of curvature comprised between two and six times the root radius.

DESCRIPTION OF THE DRAWINGS

Reference is now made to the accompanying figures, in which:

FIGS. 3 to 5 are cross-sectional views of the bolt of FIG. 2B, enlarged and fragmented.

DETAILED DESCRIPTION

Figure 1:
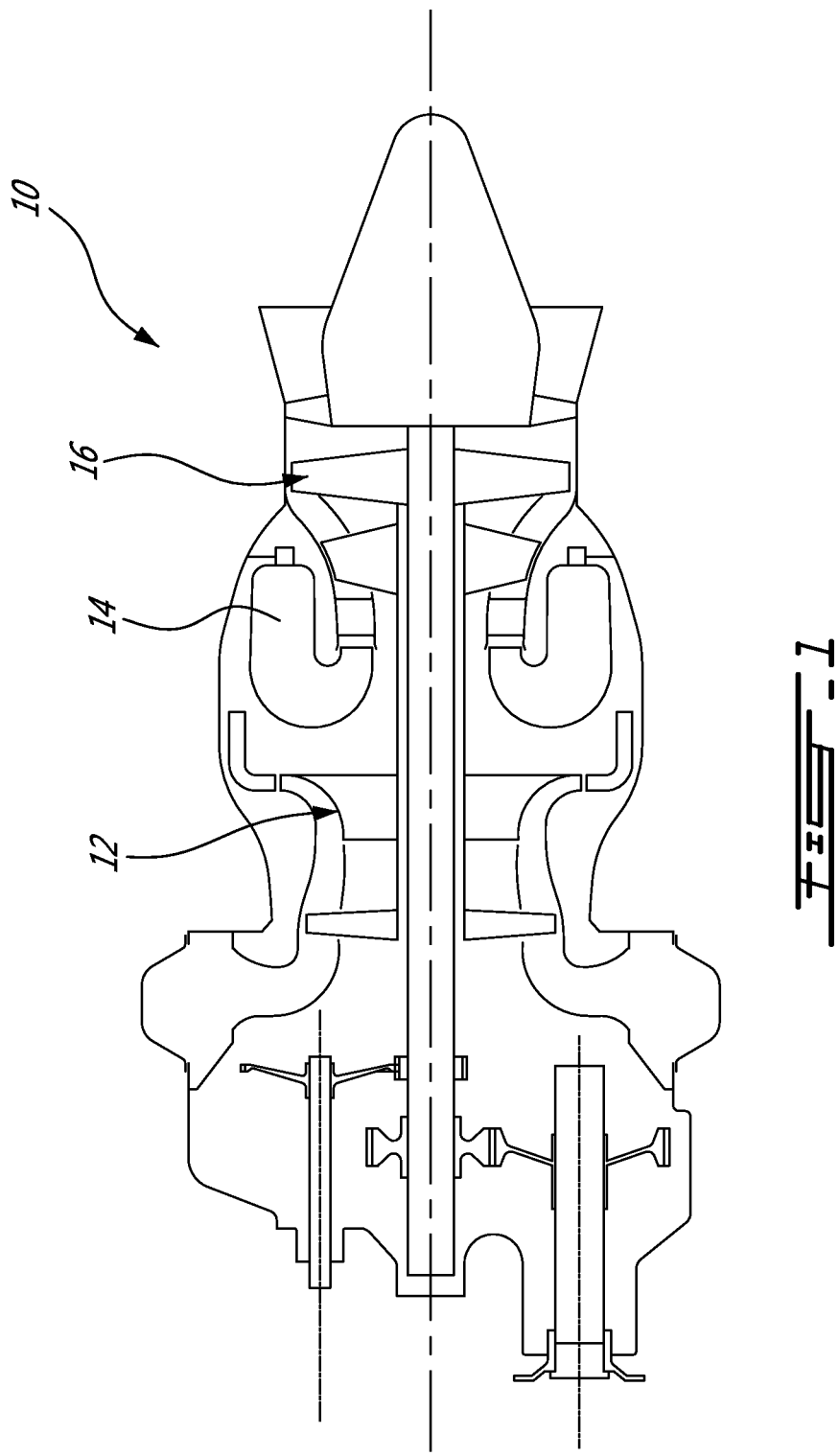
FIG. 1 is a schematic cross-sectional view of a gas turbine engine.

FIG. 1 illustrates an example of a turbine engine. In this example, the turbine engine 10 is a turboshaft engine generally comprising in serial flow communication, a multistage compressor 12 for pressurizing the air, a combustor 14 in which the compressed air is mixed with fuel and ignited for generating an annular stream of hot combustion gases, and a turbine section 16 for extracting energy from the combustion gases. The turbine engine terminates in an exhaust section. The compressor 12 and turbine section 16 include rotary components, or rotors, which revolve at high speeds around the main axis 11 of the engine.

Figure 2A:
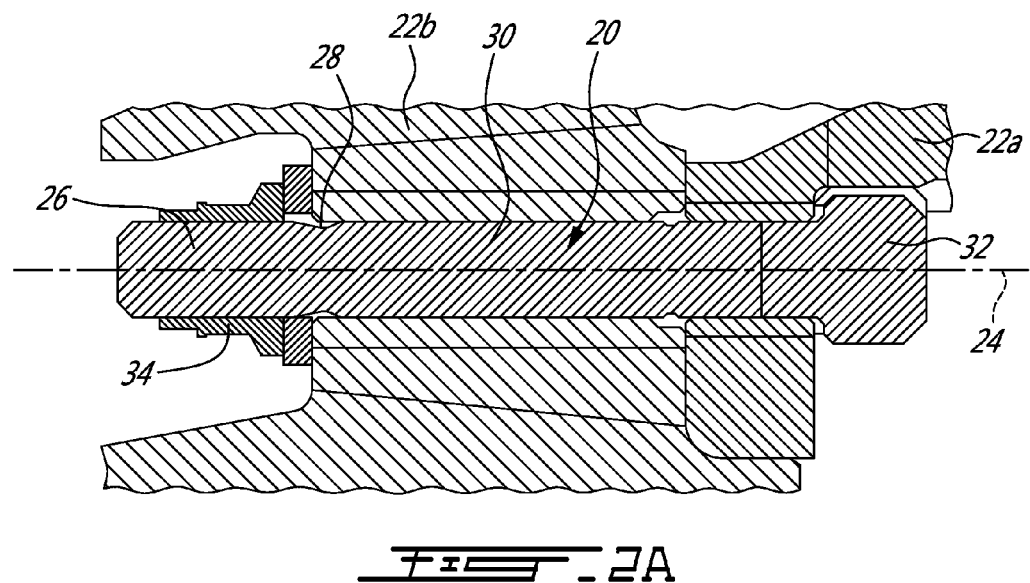
FIGS. 2A and 2B are a cross-sectional view of bolt clamping rotor components in a cold state, and during use, respectively.

FIG. 2A shows a bolt 20 having a thru bolt configuration used in clamping two rotor components 22a, 22b of gas turbine engine 10. More specifically, the bolt 20 is used to clamp a mixed flow rotor and the impeller flange together, in this specific embodiment. The bolt 20 can generally be seen to have a bolt axis 24, which is parallel to and spaced apart from the main axis 11 of the engine. In sequence along the bolt axis 11, the bolt can be seen to have a threaded portion 26, a thread run-out 28, a shank 30, and a head 32. A nut 34 is threadingly engaged onto the threaded portion 26 and torqued to secure the assembly together.

Figure 2B:
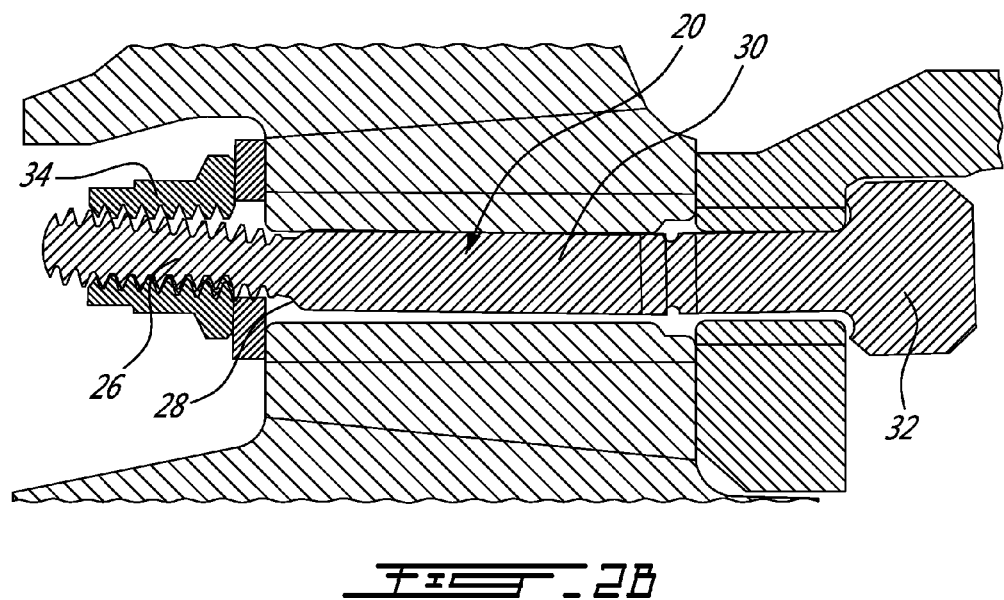

During operation of the engine 10, centrifugal acceleration imparts a radially-outward force proportional to the weight of the nut 34 and the threaded portion of the bolt 26, and proportional to the distance between the bolt axis 24 and the main axis 11, onto the threaded portion 26, which, in turn, generates a bending stress on the bolt 20; these bending stresses peaking in the run-out area 28. FIG. 2B shows an example of the deformation which can occur in the bolt 20 due to this bending load, during operation of the gas turbine engine 10.

In a traditional bolt, the transition between the thread run-out and the shank is sharp, which attracts relatively high concentrations of stress. Over time, fatigue occurring at that specific location limits the low-cycle fatigue life of the bolt.

Figure 4:
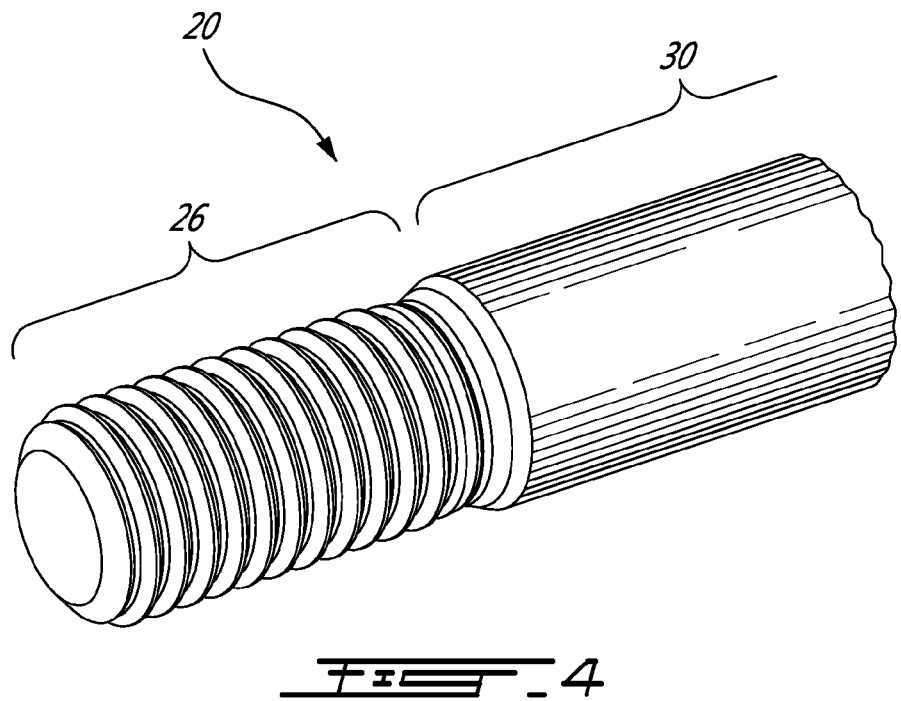
Figure 5:
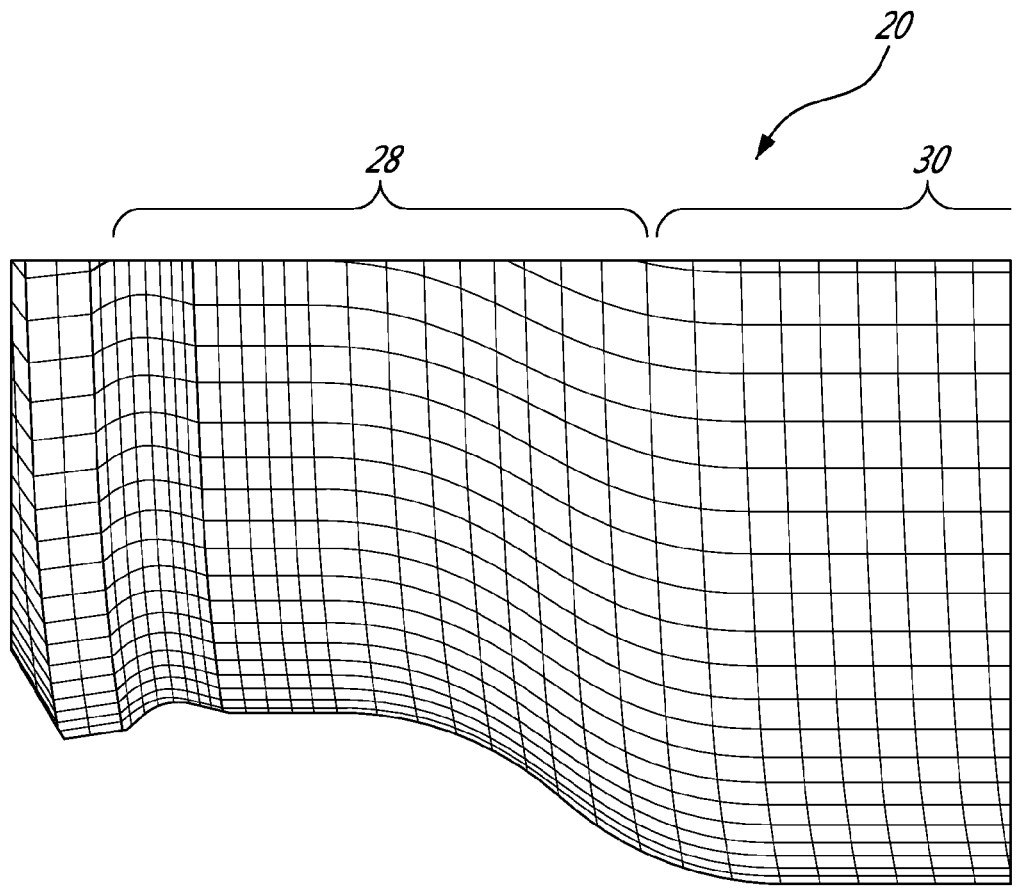

An improved thread run-out design is shown more clearly in FIG. 3. In the embodiment shown in FIG. 3, the threaded portion 26 has a thread 36 of a given depth 38 and of a given pitch 40. The thread 36 fades out into the thread run-out area 28. A run-out radius 48 connects the shank 30 via a sequence of a radially concave and annular thread run-out fillet 44 and a radially convex and annular outer shank edge 46. Numerical simulations demonstrated that by smoothening the transition between the last thread and the shank as compared with traditional bolts, the maximum amount of bending stress (peak stress) suffered by the bolt during use of the gas turbine engine was significantly reduced, which has a direct impact on the low-cycle fatigue life of the bolt 10. More specifically, in the illustrated embodiment, the thread run-out fillet 44 has a radius 48 which was designed to be between two and six times the root radius 50 of the thread 36. Preferably, the thread run-out fillet radius 44 can be between three and six times the root radius 50 of the thread 36. The specific design of the embodiment is illustrated in greater detail in the views provided in FIGS. 4 and 5.

The resulting bolt 20 can be understood to be most suited to high speed turbo machinery applications where the bolted assembly is rotated at high speed and is clamping at an appreciable length of rotor stack. In the specific embodiment illustrated, a thread with a 0.036" pitch and 0.006" root radius was used, and the bolt was made of titanium, which allowed to achieve satisfactory LCF life both for the bolt and the bolt hole, in a gas turbine revolving at very high rotational speed. Other materials and thread dimensions can be used for the bolt in alternate embodiments.

Peak stress can also be addressed by providing a satisfactorily large shank edge radius 52, although in the simulation environment, the shank edge radius 52 was not as directly relevant as the thread run-out fillet radius 48 in achieving satisfactory low-cycle fatigue life.

The simulation environment also demonstrated that low-cycle fatigue life can be affected by optimizing the length of the threaded portion. More specifically, the length of the threaded portion can be minimized on either side of the nut while satisfying the required adverse stack-up conditions outlined in design manuals.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the scope of the appended claims.

What is claimed is:

1. A bolt comprising in sequence, along a bolt axis: a threaded portion, a thread run-out portion, a shank, and a head, the threaded portion having a thread with a predetermined root radius and a predetermined depth, the thread run-out portion connected to the shank via a thread run-out fillet having an average radius of curvature comprised between two and six times the root radius; wherein the thread depth fades out at the thread run-out portion.

2. The bolt of claim 1, wherein the thread run-out fillet has a run-out profile selected from the group consisting of: a single radius, a combination of multiple radii, and a curve.

3. The bolt of claim 1 wherein the average radius of curvature is between three and six times the root radius.

4. The bolt of claim 1 wherein the average radius of curvature is between four and six times the root radius.

5. The bolt of claim 1 wherein the thread run-out fillet has a single radius, and wherein the single radius is of at least 0.012".

6. The bolt of claim 1 wherein the thread run-out fillet has a single radius, the single radius being less than 0.036".

7. The bolt of claim 1 wherein the thread run-out fillet is connected to a cylindrical portion of the shank via a convex shank edge radius.

8. The bolt as claimed in claim 1 in assembly with rotary components, with the bolt axis parallel and spaced-apart from a rotation axis of the rotary components.

9. The bolt of claim 8 wherein the rotary components are part of a gas turbine engine.

10. The bolt of claim 9 wherein the rotary components rotate about a main axis of the gas turbine engine.

11. A gas turbine engine rotor comprising first and second parts bolted together by a plurality of bolts as defined in claim 1.

* * * * *